Figure 1:
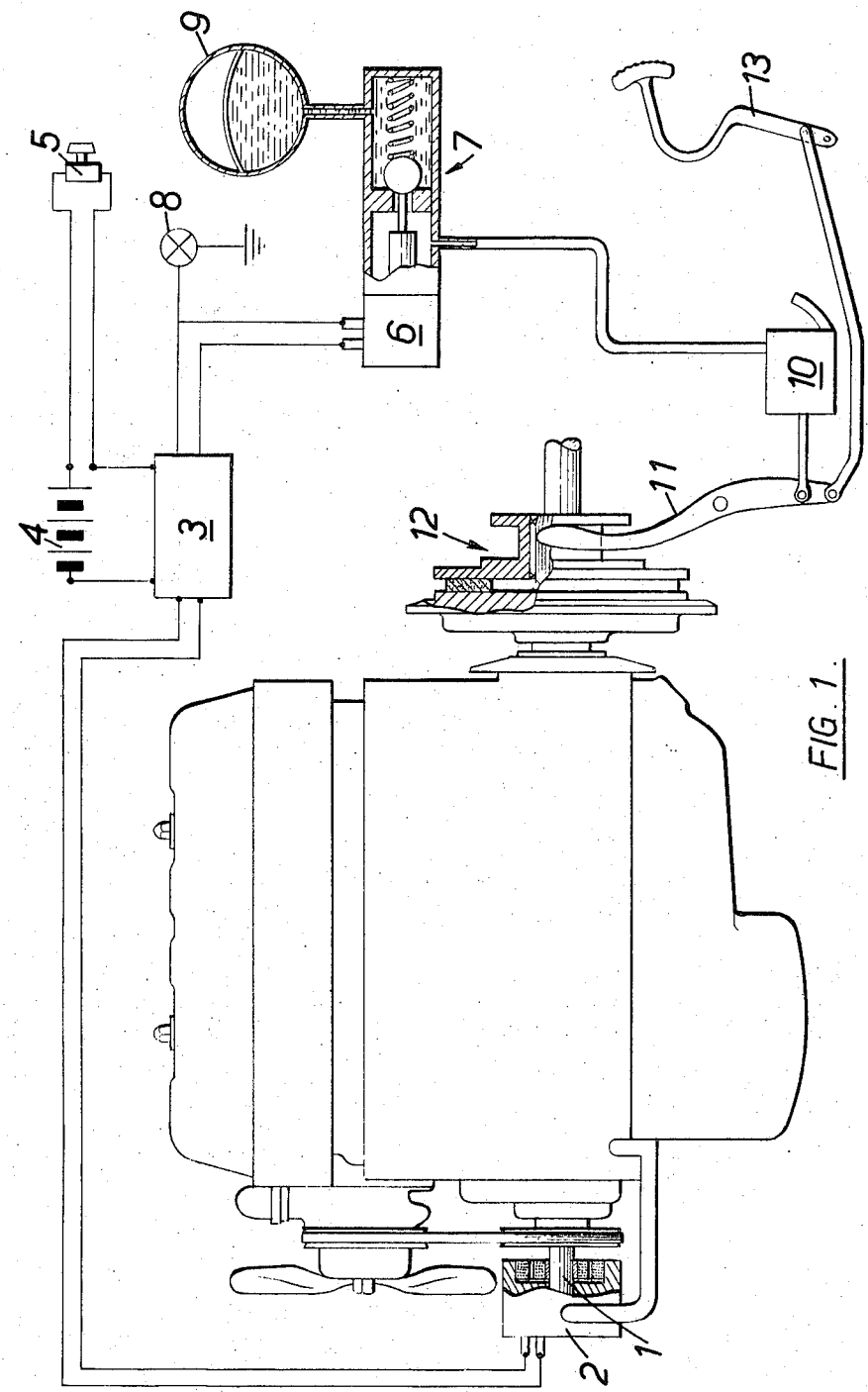

United States Patent [19]
Hess

[11] 3,817,358
[45] June 18, 1974

[54] SYSTEM FOR DISENGAGING A CLUTCH IN THE TRANSMISSION OF A VEHICLE

[75] Inventor: Wolfgang Hess, Koblenz, Germany

[73] Assignee: Girling Limited, Tyseley, Birmingham, England

[22] Filed: Nov. 10, 1972

[21] Appl. No.: 305,218

[30] Foreign Application Priority Data
Nov. 23, 1971 Great Britain.................. 54266/71

[52] U.S. Cl......... 192/.033, 192/103 R, 192/104 R, 192/40
[51] Int. Cl...................... F16d 23/00, F16d 43/24
[58] Field of Search..... 192/.033, 40, 103 R, 103 F, 192/104 R, 104 F

[56] References Cited
UNITED STATES PATENTS

| | | | |
|---|---|---|---|
| 2,924,313 | 2/1960 | Binder et al.................. | 192/.033 X |
| 2,979,171 | 4/1961 | Bland et al..................... | 192/.033 X |
| 3,134,470 | 5/1964 | Weis et al. .................. | 192/103 R X |
| 3,232,399 | 10/1963 | Harned et al. ............. | 192/104 R X |
| 3,385,986 | 5/1968 | Smith.......................... | 192/104 R X |
| 3,437,188 | 4/1969 | Long.............................. | 192/103 F |

Primary Examiner—Samuel Scott
Assistant Examiner—Lance W. Chandler
Attorney, Agent, or Firm—Scrivener, Parker, Scrivener & Clarke

[57] ABSTRACT

In a system for disengaging a clutch in a vehicle transmission a sensor provides a control unit with an electrical output related to the speed of the vehicle engine, and the control unit is arranged to send an operating signal to clutch disengaging means when the deceleration of the engine exceeds or its speed falls below a predetermined value.

6 Claims, 3 Drawing Figures

SYSTEM FOR DISENGAGING A CLUTCH IN THE TRANSMISSION OF A VEHICLE

This invention relates to systems for disengaging a clutch in a vehicle transmission.

Usually the engine of a vehicle has a minimum speed below which it will not run smoothly or it will stall. When the engine is driving the transmission and the vehicle wheel brakes are applied, the throttle closes and the transmission begins to drive the engine, slowing down its speed. It is undesirable that the engine speed should fall below the minimum speed in circumstances such as these.

According to this invention a system for disengaging a clutch in a vehicle transmission, comprises means monitoring the speed of the vehicle engine and providing a signal related thereto, and means for disengaging the clutch operable by said signal.

The monitoring means may comprise a sensor providing an output related to engine speed, and a control unit receiving the sensor output and providing a signal if the sensor output corresponds to an engine condition below a predetermined value.

Preferably the control unit is arranged to differentiate the sensor output to obtain an output corresponding to the deceleration of the engine which is compared to a predetermined value of engine deceleration.

The control unit may be arranged to compare the sensor output with a predetermined value of engine speed. However there is a time delay between the signal from the control unit and the disengaging of the clutch, being the time taken by the disengaging means to react to the signal. In situations where the engine is decelerated rapidly and a speed threshold is in use, the engine may become locked before the clutch disengaging means have reacted to the signal from the control unit. Because of this reaction delay the speed threshold has to be set higher than the minimum engine speed so that in some instances the clutch will be disengaged unnecessarily. By using a deceleration threshold in such a situation, an abnormal deceleration is sensed before the speed threshold is reached and the clutch can be disengaged in time. The better anticipation of the deceleration threshold can avoid this occurring. A speed threshold may be used in addition.

Conveniently the sensor is an A.C. generator the rotor of which is rotated by the engine, the A.C. output of the sensor being fed to the control unit which provides a D.C. signal. Alternatively the sensor may monitor electrical impulses in the ignition circuit to provide an output proportional to the speed of the engine.

It might be possible to use monitoring means in which the A.C. voltage of the sensor is compared directly with a threshold voltage. In this case the sensor would have to be able to provide a voltage output which is accurately related to engine speed.

A switch may be included in the monitoring means to by-pass the control unit so that the clutch can be engaged should the engine stall. The switch may be combined with the ignition switch.

The clutch disengaging means may be a solenoid valve in an hydraulic circuit supplying fluid to an actuator linked to the clutch withdrawal lever. Alternatively the disengaging means may be an electrical actuator directly linked to the withdrawal lever.

The monitoring means may be arranged to de-energize the actuator after a predetermined time interval following its energization, thus allowing the clutch to be re-engaged after it has been disengaged.

Preferably the actuator includes means for damping clutch re-engagement, for example, a metering orifice in the outlet port of a clutch slave cylinder allowing the clutch to re-engage gently.

The clutch may be the normal manually operated clutch or a separate special clutch in the transmission.

Several embodiments of this invention are illustrated in the accompanying drawings, in which:-

Figure 2:
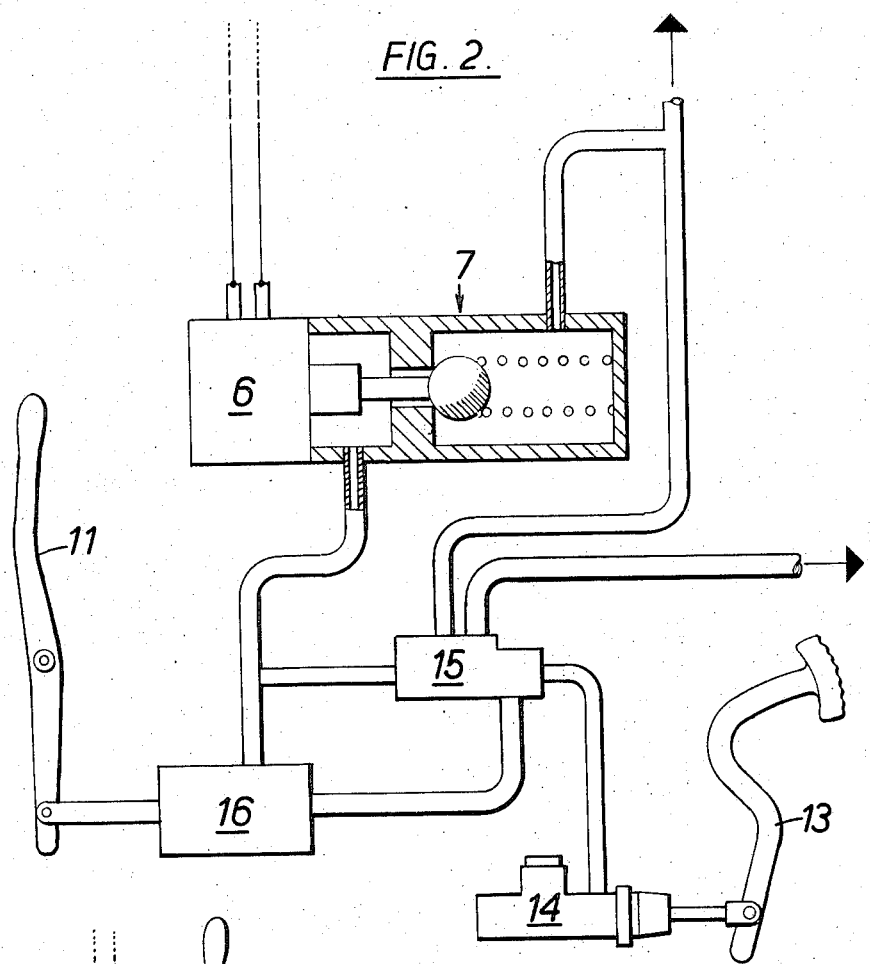
Figure 3:
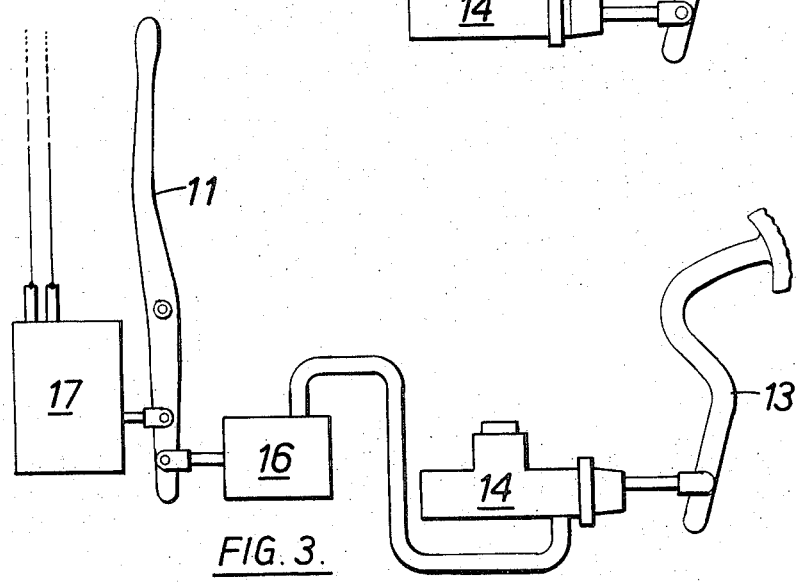

FIG. 1 is a diagrammatic layout of a clutch disengaging system with an hydraulic clutch actuator, FIG. 2 shows a modified hydraulic arrangement for actuating the clutch, and FIG. 3 shows an electrical clutch actuator.

In FIG. 1 a sensor 2 in the form of a stator of an A.C. generator secured to the engine block is located around a rotor 1 which is attached to the crank shaft. The sensor is connected to an electronic control unit 3 powered by a battery 4. A switch 5 in the battery circuit enables the control unit 3 to be made inoperative. The electronic control unit converts the A.C. output of the sensor to D.C. and it distinguishes between an increasing engine speed and decreasing engine speed. The D.C. output corresponding to decreasing engine speed is differentiated continuously and compared with a predetermined threshold value corresponding to a maximum acceptable engine deceleration.

When the output exceeds the threshold value, the output is amplified to give a signal to the solenoid 6 of a control valve 7. A light 8 indicates when the solenoid 6 has been energized.

When valve 7 is operated pressure fluid from accumulator 9 flows to slave cylinder 10 linked to the withdrawal lever 11 of clutch 12. The lever 11 is mechanically connected to the clutch pedal 13.

In FIG. 2 the clutch pedal 13 operates a master cylinder 14 which in turn operates a valve unit 15 controlling a supply of pressure fluid to a clutch slave cylinder 16. The valve 7 also controls the supply of pressure fluid through a branch line to the slave cylinder 16.

In FIG. 3 the clutch pedal 13 operates the master cylinder 14 which supplies pressure fluid directly to the slave cylinder 16. The clutch withdrawal lever 11 is directly linked to an actuator 17 which is energized by the signal from the electronic control unit 3.

In addition to preventing the engine of a vehicle from stalling unnecessarily the system of this invention can be usefully employed in controlling the vehicle in skid conditions. To avoid a braked wheel becoming locked, the braking pressure should be relieved periodically to allow the wheel to accelerate, preferably without having to drive the engine. By choosing a suitable predetermined value of engine deceleration, the system described above can declutch the engine in most situations where wheel locking is probable.

I claim:

1. A system for disengaging a clutch in the transmission of a vehicle having an engine, comprising a sensor monitoring the speed of said engine and providing a signal related to said speeds; a control unit for receiving said signals, differentiating the same to obtain an output signal corresponding to the deceleration of said engine, and comparing said output signal to a predetermined value of engine decleration, and providing a signal if said deceleration related output exceeds said predetermined value; and means operable by said signal to disengage said clutch.

2. A system as in claim 1 wherein said control unit automatically cancels said signal a predetermined time interval after providing said signal thereby allowing said clutch to re-engage.

3. A system as in claim 1 wherein said sensor is an A.C. generator having a rotor which is rotated by the crank shaft of said vehicle engine, the A.C. output of said generator being fed to said control unit which provides a D.C. signal.

4. A system as in claim 1 including a manual switch for rendering said control unit inoperative.

5. A system as in claim 1 wherein said clutch includes a clutch withdrawal lever and said clutch disengaging means comprises an electrically operated actuator linked directly to said lever.

6. A system as in claim 1 wherein said clutch disengaging means includes means for damping clutch re-engagement.

* * * * *